United States Patent
Wolf et al.

(10) Patent No.: US 12,098,581 B2
(45) Date of Patent: Sep. 24, 2024

(54) DRIVE ASSEMBLY FOR A CLOSURE ELEMENT OF A MOTOR VEHICLE

(71) Applicant: Brose Fahrzeugteile SE & Co. Kommanditgesellschaft, Bamberg, Bamberg (DE)

(72) Inventors: Maximillian Wolf, Coburg (DE); Michael Wittelsbürger, Bamberg (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 895 days.

(21) Appl. No.: 17/052,699

(22) PCT Filed: May 4, 2019

(86) PCT No.: PCT/EP2019/061470
§ 371 (c)(1),
(2) Date: Nov. 3, 2020

(87) PCT Pub. No.: WO2019/211482
PCT Pub. Date: Nov. 7, 2019

(65) Prior Publication Data
US 2021/0180385 A1    Jun. 17, 2021

(30) Foreign Application Priority Data
May 4, 2018   (DE) .................... 10 2018 110 723.4

(51) Int. Cl.
*E05F 15/622* (2015.01)
*E05F 15/41* (2015.01)
(Continued)

(52) U.S. Cl.
CPC ............ *E05F 15/41* (2015.01); *E05F 15/611* (2015.01); *F16D 41/203* (2013.01); *B60J 5/10* (2013.01);
(Continued)

(58) Field of Classification Search
CPC ....... E05F 15/622; E05F 15/652; E05F 15/41; F16D 41/206; F16D 67/00; F16D 67/02; F16D 2127/005
See application file for complete search history.

(56) References Cited

U.S. PATENT DOCUMENTS 3,797,618 A * 3/1974 Peterson ............... F16D 13/025
  192/26
3,966,024 A * 6/1976 Baer ....................... F16D 67/02
  188/82.6
(Continued)

FOREIGN PATENT DOCUMENTS

DE   19907483 A1   8/2000
DE   202007010232 U1   11/2008
(Continued)

*Primary Examiner* — Bradley T King
(74) *Attorney, Agent, or Firm* — Dickinson Wright PLLC

(57) ABSTRACT

A drive assembly configured to adjust a motor vehicle closure element including a clutch assembly provided with an input connection and an output connection. The clutch assembly includes a main braking element, configured to brake a movement from the output side, and a freewheel assembly configured to engage the main braking element from movement of the output side and disengage the main braking element by means of a movement from the input side. The brake assembly includes an auxiliary braking element configured to produce a predetermined permanent braking action by means of which the auxiliary braking element acts at least against the movement introduced on the output side, and that the predetermined permanent braking action of the auxiliary braking element has to be overcome to enable the freewheel assembly to disengage.

18 Claims, 4 Drawing Sheets

(51) Int. Cl.
   *E05F 15/611* (2015.01)
   *F16D 41/20* (2006.01)
   *B60J 5/10* (2006.01)
   *E05F 15/632* (2015.01)

(52) U.S. Cl.
   CPC ......... *E05F 15/632* (2015.01); *E05Y 2201/21* (2013.01); *E05Y 2201/216* (2013.01); *E05Y 2201/234* (2013.01); *E05Y 2201/26* (2013.01); *E05Y 2201/484* (2013.01); *E05Y 2800/422* (2013.01); *E05Y 2900/531* (2013.01); *E05Y 2900/536* (2013.01); *E05Y 2900/538* (2013.01); *E05Y 2900/546* (2013.01); *E05Y 2900/548* (2013.01)

(56) References Cited

U.S. PATENT DOCUMENTS

| | | | | |
|---|---|---|---|---|
| 4,623,051 | A * | 11/1986 | Lochmoeller | F16D 41/206 192/223.4 |
| 6,742,640 | B1 * | 6/2004 | Grogg | F16D 7/022 192/81 C |
| 10,883,300 | B2 * | 1/2021 | Wittelsbuerger | E05F 15/41 |
| 11,415,206 | B2 * | 8/2022 | Lück | B60T 11/046 |
| 11,732,768 | B2 * | 8/2023 | Eckerle | F16D 13/10 192/13 A |
| 2006/0049009 | A1 * | 3/2006 | Arnold | F16D 67/00 188/82.6 |
| 2011/0303032 | A1 * | 12/2011 | Oberle | F16D 51/00 74/89.39 |
| 2013/0169087 | A1 * | 7/2013 | Kummer | E05F 11/50 310/76 |
| 2014/0232225 | A1 * | 8/2014 | Heinze | F16D 43/02 310/76 |
| 2018/0371821 | A1 * | 12/2018 | Fees | E05F 15/622 |
| 2023/0175560 | A1 * | 6/2023 | Isobe | F16D 7/022 192/41 S |

FOREIGN PATENT DOCUMENTS

| | | |
|---|---|---|
| DE | 102014100125 A1 | 7/2015 |
| WO | 2012007551 A1 | 1/2012 |
| WO | 2013045099 A1 | 4/2013 |
| WO | 2017081277 A1 | 5/2017 |
| WO | 2018015452 A1 | 1/2018 |

* cited by examiner

DRIVE ASSEMBLY FOR A CLOSURE ELEMENT OF A MOTOR VEHICLE

CROSS-REFERENCE TO RELATED APPLICATIONS

This application is the U.S. National Phase of PCT Application No. PCT/EP2019/061470 filed on May 4, 2019, which claims priority to German Patent Application No. DE 10 2018 110 723.4, filed on May 4, 2018, the disclosures of which are hereby incorporated in their entirety by reference herein.

TECHNICAL FIELD

The present disclosure relates to a drive assembly for a closure element of a motor vehicle.

BACKGROUND

The drive assembly under discussion is used in the context of the motorized adjustment of any closure elements of a motor vehicle. Such closure elements can be tailgates, trunk lids, engine hoods, load space floors but also doors, especially sliding doors, of a motor vehicle. In the present case, therefore, the term "closure element" should be interpreted broadly. The important point here is that the closure element usually allows not only motor operation but also manual operation by a user, during which there is no risk to the user.

This proven prior art makes it possible to implement large differences between the braking action which opposes a movement introduced on the input side and the braking action which opposes a movement on the output side. If a closure element, e.g. a (tailgate) flap, is in certain intermediate positions, a large part of the weight thereof is often not transmitted into the brake assembly, purely by virtue of the design or of installed dampers of the drive assembly. In the case of a closure element which is fitted with two drive assemblies, it may happen that the drives do not run quite synchronously and one drive introduces a movement on the output side into the brake assembly of the other drive assembly via the flap. This does not result in adjustment of the closure element since this movement introduced on the output side is braked, but the freewheel clutch, which generally exhibits play owing to its design, may rattle.

SUMMARY

One or more problems addressed by the present disclosure is provide a drive assembly to decrease noise generation.

According to one embodiment a drive assembly is provided. The drive assembly may include a freewheel assembly that may be connected to, at least on the output side, an auxiliary braking element with a predetermined permanent braking action which brakes a movement introduced on the output side so that the freewheel assembly is not engaged or disengaged immediately with every small movement. For example, this auxiliary braking element can always oppose a predetermined permanent braking action to all movements which would otherwise be introduced directly into the freewheel assembly. Accordingly, an envisaged main braking action of the brake assembly can be smaller since the permanent braking action is added thereto. Since this auxiliary braking element does not have to be integrated structurally into the freewheel clutch and is preferably also not integrated into the latter, there are more degrees of freedom in the design, and wear can be reduced.

According to another embodiment, a clutch element, such as a wrap spring, is provided as part of the freewheel assembly. By virtue of the auxiliary braking element connected thereto, the clutch element can be of radially and/or axially adjustable configuration. A contact surface, which, in the engaged state of the freewheel assembly and thus of the clutch assembly, i.e. when the main braking element is braking the main braking action of a movement introduced on the output side, is connected non-positively to the main braking element. In the disengaged state, it is not connected non-positively to the main braking element, such as not being connected to it at all. As a result, there is preferably no friction between the contact surfaces in the disengaged state, this having the advantage that the wrap spring does not wear in the case of movements introduced on the input side.

In one or more embodiments, the brake assembly may be configured in such a way that the main braking action arises between the main braking element and the auxiliary braking element are friction surfaces which may produce the main braking action and the auxiliary braking action.

As an example, the friction surfaces which produce the main braking action and the auxiliary braking action are spaced apart radially.

The permanent braking action is less than the main braking action.

The drive assembly is configured in such a way that, for the purpose of adapting the drive assembly to a different model of motor vehicle for example, a spring is provided which can be interchanged and/or adjusted in order to change the magnitude of the predetermined permanent braking action and of the main braking action. It may be possible to adapt the drive assembly during manufacture by interchanging or preferably adjusting just one part, for which purpose an adjusting screw that adjusts the spring.

According to one or more embodiments, a drive assembly having a wrap spring in a freewheel assembly, the contact surface of which, as already described, is not in contact with a contact surface of the main braking element in a disengaged state Reference may be made to all the statements made in relation to the drive assembly according to the proposal in accordance with the first teaching.

According to yet another teaching, a drive assembly for a closure element of a motor vehicle is provided. The drive assembly may include a clutch assembly connected into a drivetrain of the drive assembly is provided with an input connection and an output connection, wherein in any case the clutch assembly transmits a movement which is introduced on the input side to the output connection, wherein the clutch assembly has a brake assembly with a main braking element, which produces a main braking action, by means of which the main braking element brakes a movement introduced on the output side, wherein the clutch assembly has a freewheel assembly, wherein the freewheel assembly engages the main braking element by means of the movement introduced on the output side and disengages the main braking element by means of a movement introduced on the input side.

The drive assembly according to one or more embodiments may be configured by means of features of the present disclosure. Here, the drive assembly may not need to be fitted with an additional auxiliary braking element as described above. To this extent, reference may be made to all the statements made in relation to the drive assembly according to the proposal in accordance with the above teachings.

According to yet another embodiment, which is of independent significance, a closure element assembly as such is claimed which has one or more proposed drive assemblies, the drivetrain of at least one or all the drive assemblies extends between a body of the motor vehicle and the closure element. Reference may be made to all the statements made in relation to the drive assembly according to the proposal in accordance with the above teachings.

BRIEF DESCRIPTION OF THE DRAWINGS

The invention is explained in greater detail with reference to a drawing, which illustrates only illustrative embodiments. In the drawing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known drive assembly is provided in WO 2013/045099 A1 and includes a clutch assembly that is connected on the input side to a motor and on the output side to the closure element and that has a brake assembly and a freewheel assembly. The freewheel assembly engages the brake assembly when the closure element is adjusted, in particular by manual actuation, and thus an output-side movement is introduced into the clutch assembly. This enables the brake assembly to bear the dead weight of the flap, thus enabling it to be held securely in any positions between the open position and the closed position. In the case of an input-side movement, on the other hand, the main braking element is disengaged, thereby ensuring that the braking force is not opposed by the drive during adjustment.

Figure 1:
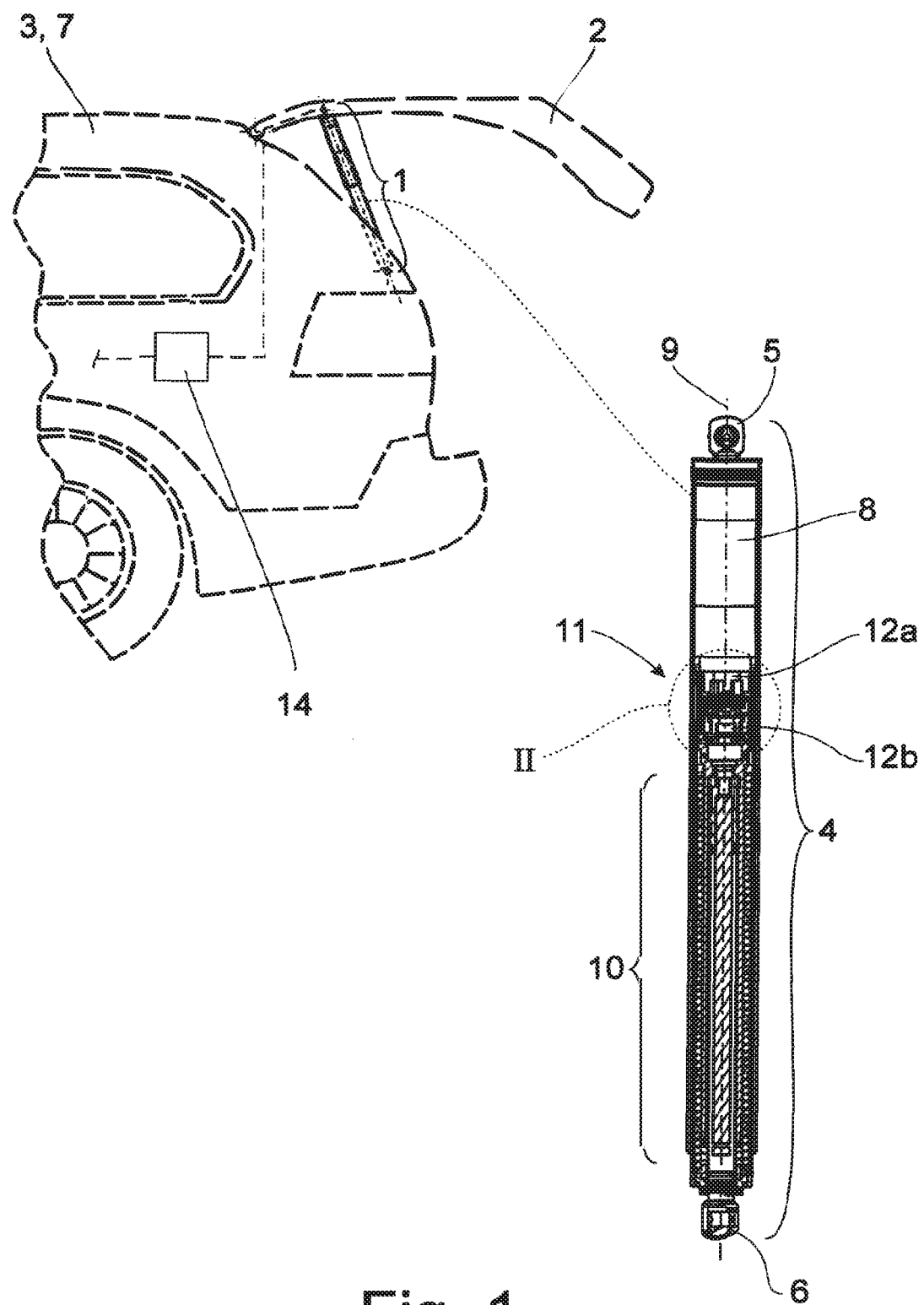
FIG. 1 shows the rear region of a motor vehicle having a drive assembly according to the proposal for the closure element assembly located there.

The drive assembly 1 illustrated in FIG. 1 is used for motorized adjustment of a closure element 2, which may be a liftgate of a motor vehicle 3. The drive assembly 1 can also be used for other closure elements, in respect of which attention is drawn to the introductory part of the description.

As an example, the drivetrain 4 illustrated on an enlarged scale in the right-hand part of FIG. 1, which is part of the drive assembly 1, has connections 5, 6 at both ends, which are connected mechanically to the body 7 and the closure element 2, with the result that movements of a drive of the drive assembly, which, here and for example, has a motor 8, such as an electric motor, can be output via the connections 5, 6, thereby adjusting the closure element 2. Here, "adjust" means that the closure element can be moved in a known manner into an open position (FIG. 1) and a closed position (not shown) and, in between, occupies intermediate positions (not shown). During this process, the axial extent of the drivetrain 4 along a drive axis 9 generally changes. Provision can also be made for the drivetrain 4 to be branched and, for example, for not all the components to be arranged along the drive axis 9.

Furthermore, the drivetrain 4 in this case has a spindle/spindle nut mechanism 10. In this case, there is a clutch assembly 11 between the spindle/spindle nut mechanism 10 and the drive with the motor 8, said clutch assembly being connected by means of an input connection 12a to the drive, thus enabling the drive to introduce movements into the clutch assembly 11 on the input side, and being connected by means of an output connection 12b to the spindle/spindle nut mechanism 10, which can introduce movements into the clutch assembly 11 on the output side. Provision is furthermore made for these movements, with partial braking, as will be explained, to be transmitted between these two connections 12a, 12b of the clutch assembly 11. Here and for example, the output connection 12b and the input connection 12a form claws of a claw clutch.

It is thus possible for the motor 8 to adjust the closure element 2 by motor power. In addition, it is envisaged that the closure element 2 can also introduce a movement, such as a movement by a user, into the drivetrain via one of the connections 6, this movement then being introduced on the output side into the clutch assembly 11 via the output connection 12b.

Here and for example, therefore, a clutch assembly 11 connected into a drivetrain 4 of the drive assembly 1 is provided with an input connection 12a and an output connection 12b, wherein in any case the clutch assembly 11 transmits a movement which is introduced on the input side to the output connection 12b.

It is also possible to provide for the closure element 2 to be adjusted by means of two, preferably identical, drive assemblies 1 according to the proposal or by means of one drive assembly 1 according to the proposal and one drive assembly of a different type, which are preferably situated at two opposite ends of the closure element 2.

Here and for example, the drive assembly 1 is controlled by a control unit 14 which can receive and carry out user instructions to open or close the closure element 2, for example.

Figure 2:
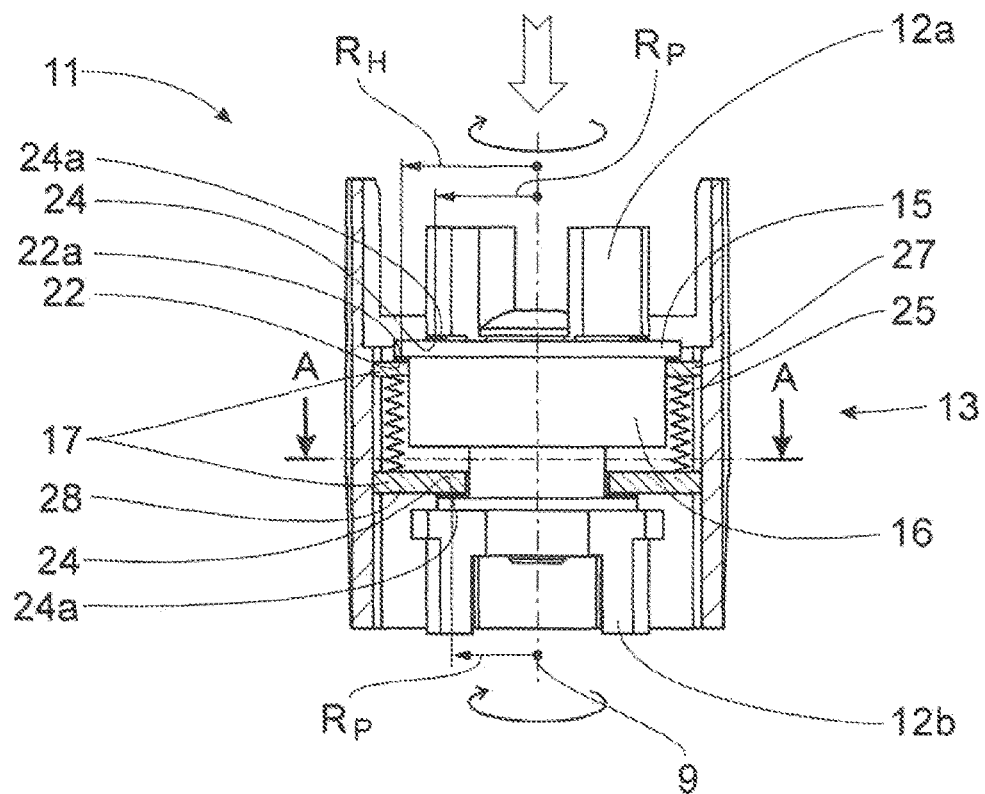
FIG. 2 shows the clutch assembly in the drivetrain of the drive assembly shown in FIG. 1 in region II, in the case of a movement introduced on the input side, as well as a cross section along section plane A-A.
Figure 2:
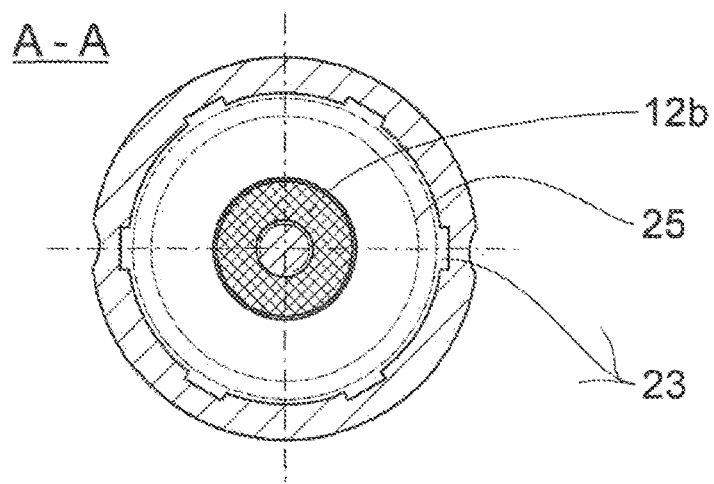

In the upper area, FIG. 2 shows an enlarged detail of the clutch assembly 11. In general, the clutch assembly 11 has a brake assembly 13 with a main braking element 15, which produces a main braking action, by means of which the main braking element 15 brakes a movement introduced on the output side.

In general, the main braking action is produced by a braking load, which can be a braking force or a braking torque, which can in principle be produced in any desired manner. The essential point here is that the main braking action ensures that a movement introduced on the output side into the clutch assembly 11, i.e. a movement which is introduced via the output connection 12b, is slowed or prevented, depending on the strength of the movement. However, the main braking action is produced by a friction torque or a frictional force, wherein static or rolling and/or sliding friction is intended, depending on the state concerned.

Moreover, the clutch assembly 11 has a freewheel assembly 16, wherein the freewheel assembly 16 engages the main braking element 15 by means of the movement introduced on the output side and disengages the main braking element 15 by means of a movement introduced on the input side. Here and for example, the movements introduced into the clutch assembly 11 are transmitted through the freewheel assembly 16, but it is also sufficient, for example, if these are transmitted only partially into the freewheel assembly 16 as long as engagement and disengagement can thereby be achieved. If not otherwise specified, "the movements introduced on the output side or the input side" always mean those which are introduced into the clutch assembly 11 at the output connection 12b and the input connection 12a respectively.

The main braking action occurs if the movement introduced on the output side has led to engagement of the main braking element 15.

One possible embodiment of the freewheel clutch 16 is furthermore described below. Another illustrative freewheel clutch 16, which can also be used in accordance with the proposal, is shown in WO 2013/045099 A1, which was originated by the applicant and the contents of which are herewith incorporated into the subject matter of the present application.

The situation is very preferably such that all output-side movements, i.e. both opening and closing of the closure element 2, can lead to engagement of the main braking element 15 and that all input-side movements caused by the motor 8 can lead to disengagement.

However, precisely to ensure that not just the slightest movement leads directly to a change in the states or positions of the components of the freewheel clutch 16, it is envisaged according to the proposal that the brake assembly 13 has an additional auxiliary braking element 17, which produces a predetermined permanent braking action, by means of which the auxiliary braking element 17 acts at least against the movement introduced on the output side, and the predetermined permanent braking action of the auxiliary braking element 17 has to be overcome to enable the freewheel assembly 16 to disengage.

As an example, similarly to the main braking action, the predetermined permanent braking action is produced by a braking force or a braking torque, such as a friction torque. According to the proposal, the predetermined permanent braking action is characterized by the fact that it is produced by a defined auxiliary braking element 17. It is thus precisely not the internal friction which in general unavoidably occurs in the drive assembly 1 but is preferably at least twice as great, or at least ten times as great. It may be defined locally by the auxiliary braking element 17 and produced directly adjoining the freewheel assembly 16, as a further example on both sides of the freewheel assembly 16, wherein the two sides refer to the input connection 12a and the output connection 12b.

Figure 4:
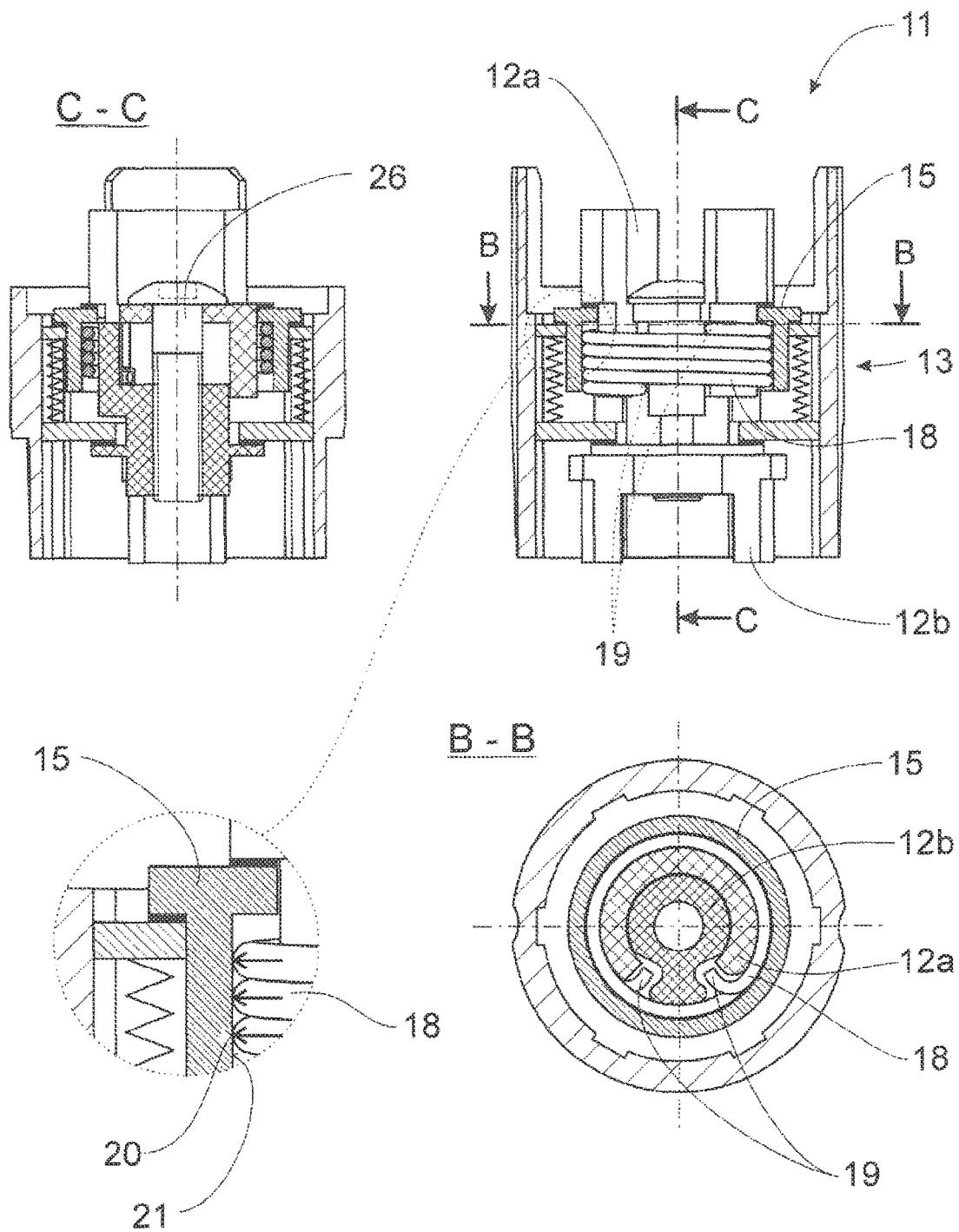
FIG. 4 shows three views of an illustrative embodiment of the clutch assembly as a cross section along section plane B-B and as a longitudinal section along section plane C-C.

An illustrative embodiment of the freewheel assembly 16 is shown in FIG. 4. For example, the situation is such that the freewheel assembly 16 has a clutch element, such as a wrap spring 18, the radial and/or axial extent of which can be adjusted by movements introduced into the clutch assembly 11 and which engages and disengages the main braking element 15 as a result.

The function of the overall drive assembly, which is explained by way of example below with reference to the illustrative embodiment from FIG. 4 for the freewheel assembly 16, will be evident from a joint consideration of FIGS. 2 to 4, and the statements apply mutatis mutandis to other freewheel assemblies 16 and other clutch elements.

One possible implementation of this function is shown at the bottom right in FIG. 4 in a cross section along section plane B-B. As shown in FIG. 2, an input-side movement, for example every input-side movement, is initiated by the input connection 12a, whereupon, for example, said connection first of all moves one of the wrap spring ends 19, which can be seen at the bottom right in FIG. 4, thereby reducing the radial extent of the wrap spring 18. Depending on whether the movement takes place in the opening direction of the closure element 2 or in the closing direction thereof, one wrap spring end 19 or the other is moved. The holding force, indicated by arrows at the bottom left in FIG. 4, between the wrap spring 18 and the main braking element 15 is thereby reduced. As an example, the radial extent can also be reduced to such an extent that there is no longer any contact between the wrap spring 18 and the main braking element 15.

The wrap spring ends 19 that can be seen in FIG. 4 are not situated in the same plane there, one being the lower end of the wrap spring 18, the other being the upper end, which is situated approximately at the level of section plane B-B in FIG. 4, and the cross section thus represents a plan view that combines several planes.

The movement introduced on the input side is then transmitted from the input connection 12a, via one of the wrap spring ends 19, to the output connection 12b, while the wrap spring 18 moves freely within the braking element 15. In contrast to the following description of the engaged state, the braking element 15 is not co-rotated, consequently being disengaged.

Figure 3:
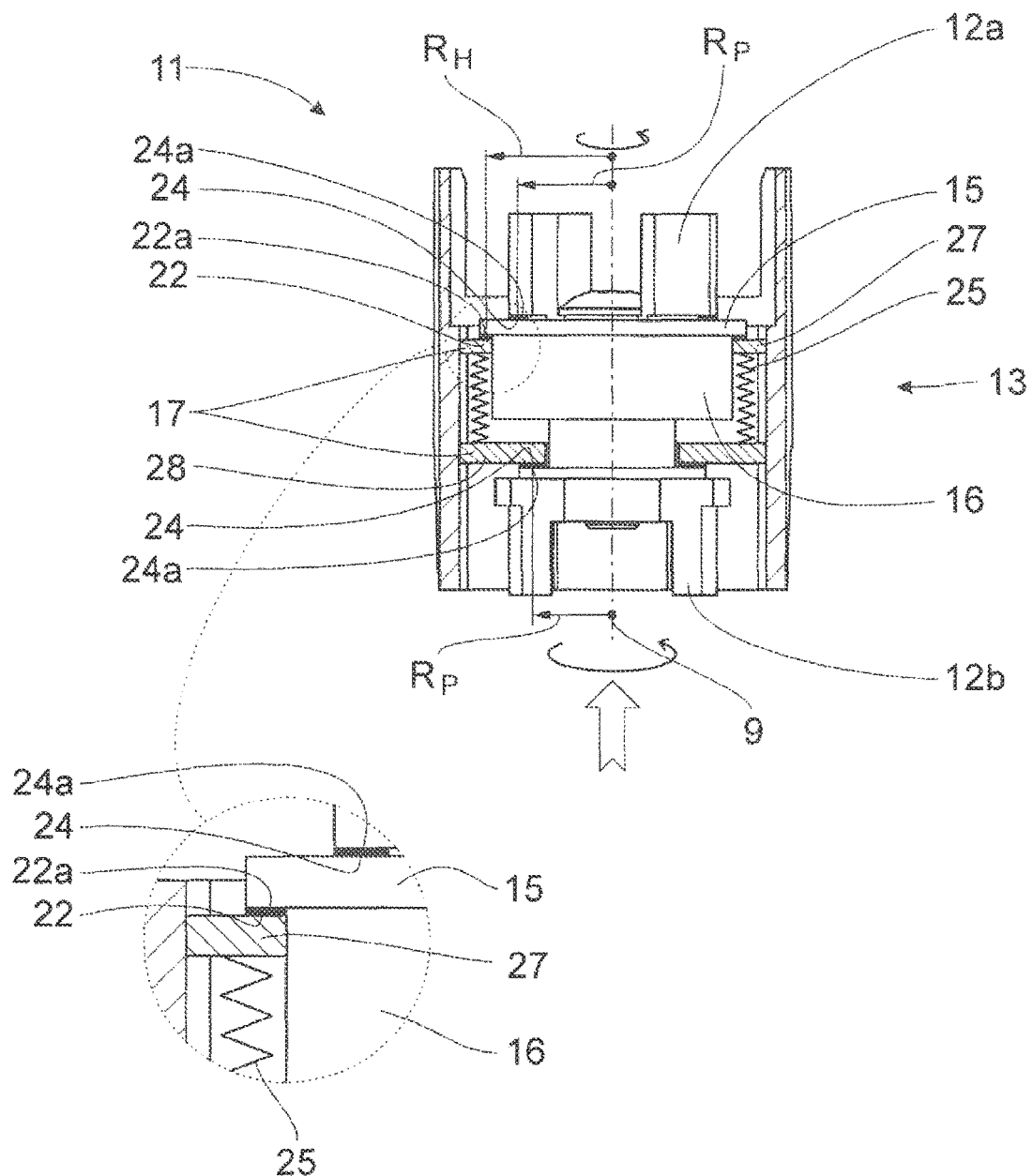
FIG. 3 shows the clutch assembly in the case of a movement introduced on the output side.

As shown in FIG. 3 and FIG. 4, a movement, for example every movement, introduced on the output side by the output connection 12b is also transmitted from the output connection 12b to the wrap spring ends 19, but in each case from the other side of the respective wrap spring end 19. There too, there is a directional dependence as regards the wrap spring end 19 to which the movement is transmitted. Similarly, for example, this movement is transmitted to the input connection 12a, with the difference that the axial extent of the wrap spring 18 increases, thereby increasing the force between the wrap spring 18 and the main braking element 15. A nonpositive connection is thereby formed between the two. The wrap spring 18 cannot move freely and takes the main braking element 15 along in its rotation. For example, the contact between the two occurs via a contact surface 20 of the wrap spring 18 and a contact surface 21 of the main braking element 15.

In each case, the movements can also be transmitted indirectly via transmission elements, for example, but this is not shown here.

As an example therefore, the situation is such that a contact surface of the clutch element, such as a contact surface 20 of the wrap spring 18, is connected non-positively, such as for conjoint rotation, to a contact surface 21 of the main braking element 15 in a state in which the main braking element 15 is engaged, and the two contact surfaces 20, 21 are rotatable relative to one another, such as without contact, in a state in which the main braking element 15 is disengaged.

As an example, the situation is furthermore such that the auxiliary braking element 17 has a main friction surface 22, which produces the main braking action in the engaged state of the main braking element 15 by friction with a mating friction surface 22a of the main braking element 15 and in this way brakes the movement introduced on the output side. As an example, in the case of a movement introduced on the output side the main braking element 15 is taken along by the freewheel assembly 16 and rubs against the main friction surface 22 of the auxiliary braking element 17, which is in turn nonrotatable relative to the outer shell of the clutch assembly 11. The non-rotatability can be achieved by means of projections 23 of the auxiliary braking element in recesses of an outer shell of the clutch assembly 11, as shown in FIGS. 2 and 4, for example.

The situation is such that the auxiliary braking element 17 and/or the main braking element 15 have/has at least one, preferably at least two, permanent friction surface(s) 24 that is/are spaced apart axially and each have a defined friction lining, which produces the predetermined permanent braking action of the auxiliary braking element 17, in each case by friction against an associated mating friction surface 24a of the input connection 12a and/or output connection 12b. The situation may be that two or at least two permanent friction surfaces 24 are provided, of which one is on the auxiliary braking element 17 and one is on the main braking element 15 and the respective mating friction surfaces 24a of which are on the input connection 12a and on the output connection 12b and brake any movement that is introduced into the freewheel assembly 16. As a result, any movement which is to be transmitted by the clutch assembly 11 must first overcome the static friction of the permanent friction surfaces 24, with the result that the freewheel assembly 16 is also adjusted only when this static friction has been overcome. As an example, the situation in this case is such that the permanent friction surfaces 24 have defined friction linings by which the permanent braking action can be influenced in the design process. As an example, one of the permanent friction surfaces 24a is taken along by the main braking element 15 when the latter is engaged, with the result that this permanent braking surface 24 is deactivated.

In order to obtain further degrees of freedom in the design process, the respective permanent friction surface 24 has a mean friction radius $R_P$, in relation to a drive axis 9 of the drivetrain, which is smaller than a mean friction radius $R_H$ of the main friction surface 22. This means that the permanent friction surfaces 24 and the main friction surface 22 can be arranged over a circular area, coaxially around the drive axis 9, wherein the mean radii of the surfaces 22, 24 differ. By this means, it is possible to advantageously configure a braking torque of the respective surfaces 22, 24. If different permanent friction surfaces 24 are provided on the input side and the output side, the friction radii thereof can also differ in order, for example, to brake output-side movements more powerfully.

As an example, the situation is that the predetermined permanent braking action is smaller in magnitude than the main braking action, preferably that the predetermined permanent braking action is overcome during each adjustment of the closure element. As an example, as already explained above, any movement introduced into the clutch assembly 11 will first have to overcome the static friction of the permanent friction surfaces 24 before it can have an effect on the freewheel assembly 16. Noise generation can thereby be avoided in a particularly simple manner.

The control unit 14 which adjusts the closure element is frequently fitted with a rotational speed sensor system on the motor 8. By means of the auxiliary braking element 17, which to this extent forms a kind of mechanical low-pass filter for movements introduced into the clutch assembly 11, control of the movement by the control unit 14 is simplified, which represents a further advantage of the drive assembly 1 in accordance with the proposal.

The situation is furthermore such that the auxiliary braking element 17 has a spring 25, for example a wave spring, which can be interchanged and/or adjusted, thus changing the magnitude of the predetermined permanent braking action of the auxiliary braking element 17 and/or the magnitude of the main braking action. As an example, the situation is such that two permanent friction surfaces 24 are provided on the input side and the output side of the freewheel assembly 16, and one main friction surface 22 is provided. As an example, these are part of the auxiliary braking element 17 and can all be influenced by a single wave spring, with the result that their contact pressure against the respective mating friction surfaces 22a, 24a and thus also their respective main/auxiliary braking action change. This represents a structure of particularly simple design.

As an alternative or in addition to the simple interchangeability of the spring 25, the situation is such that, for adjustment, such as adjustment of the axial extent, of the spring 25, an adjusting element, such as an adjusting screw 26, is provided, which preferably extends along the drive axis of the drivetrain. As an example, the adjusting element is arranged coaxially with the drive axis 9 and, for example centrally in the clutch assembly 11 as regards the radial extent, whereby the overall design can be of compact configuration. However, an adjusting element that extends orthogonally with respect to the drive axis 9 is also conceivable, for example. As an example, the adjusting screw 26 acts in such a way that it can be tightened and loosened in a thread and thereby moves an upper part 27 and a lower part 28 of the auxiliary braking element 17 closer together or further apart in the axial direction (parallel to the drive axis 9) and, in the process, compresses or extends the spring 25 between these parts 27, 28.

According to another teaching, which is of independent significance, a drive assembly 1 for a closure element 2 of a motor vehicle 3 is claimed, wherein a clutch assembly 11 connected into a drivetrain 4 of the drive assembly 1 is provided with an input connection 12a and an output connection 12b, wherein in any case the clutch assembly 11 transmits a movement which is introduced on the input side to the output connection 12b, wherein the clutch assembly 11 has a brake assembly 13 having a main braking element 15, which brakes a movement introduced on the output side by means of a main braking action, wherein the clutch assembly 11 has a freewheel assembly 16, wherein the freewheel assembly 16 engages the main braking element 15 by means of the movement introduced on the output side and disengages the main braking element 15 by means of a movement introduced on the input side. Reference may be made to all the statements made in relation to the drive assembly 1 according to the proposal in accordance with the first teaching. It is essential here that the freewheel assembly 16 has a wrap spring 18, the radial and/or axial extent of which can be adjusted by movements introduced into the clutch assembly 11 via the output connection 12b and the input connection 12a and which engages and disengages the main braking element 15 as a result, and that a contact surface 20 of the wrap spring 18, is connected non-positively to a contact surface 21 of the main braking element 18 in a state in which the main braking element 15 is engaged, and the two contact surfaces 20, 21 are not in contact with one another in a state in which the main braking element 15 is disengaged.

The situation is such that no friction arises between the two contact surfaces 20, 21 during all the movements introduced on the input side. The situation is furthermore such that there is then a gap between the two contact surfaces 20, 21.

According to another teaching, which is of independent significance, a drive assembly for a closure element 2 of a motor vehicle 3, including a clutch assembly 11 connected into a drivetrain 4 of the drive assembly 1 is provided with an input connection 12a and an output connection 12b, wherein in any case the clutch assembly 11 transmits a movement which is introduced on the input side to the output connection 12b, wherein the clutch assembly 11 has a brake assembly 13 with a main braking element 15, which produces a main braking action, by means of which the main braking element 15 brakes a movement introduced on the output side, wherein the clutch assembly 11 has a freewheel assembly 16, wherein the freewheel assembly 16 engages the main braking element 15 by means of the movement introduced on the output side and disengages the main braking element 15 by means of a movement introduced on the input side.

Here, the drive assembly 1 according to the proposal in accordance with the last-mentioned teaching is not fitted with an additional auxiliary braking element as described above. Irrespective of this, the drive assembly 1 according to the proposal can have one or more of the further features described above. To this extent, reference may be made to all the statements made in relation to the drive assembly 1 according to the proposal in accordance with the first and the second teaching.

The drive assembly 1 according to the proposal in accordance with the last-mentioned teaching, just like that in accordance with the first or the second teaching, has a sleeve-shaped main braking element 15, wherein a clutch element, for example a wrap spring 18, of the freewheel assembly 16 is arranged in the radial interior of said main braking element, the clutch element or spring being adjustable in its radial and/or axial extent by means of movements introduced into the clutch assembly 11 and engaging and disengaging the main braking element 15 as a result.

The sleeve-shaped main braking element 15 can be held axially between the input connection 12a and the output connection 12b and/or between the input connection 12a and the outer shell, i.e. the housing, of the clutch assembly 11 by means of a defined axial clamping force. As an example, the clamping force can be adjusted by means of the adjusting screw 26 by tightening or loosening the adjusting screw 26 in the thread.

The main braking element 15 can be coupled for conjoint rotation to a brake disk, for example a brake disk which is mounted in an axially movable or floating manner and interacts with a braking effect with one or more braking elements that are nonrotatable relative to the outer shell or housing of the clutch assembly 11. The braking element or elements can likewise be mounted in an axially movable or floating manner on the outer shell or housing of the clutch assembly 11. Furthermore, the brake disk and the braking element or elements can be preloaded axially against one another by means of a spring 25 of the kind described above, for example a wave spring. As an example, the spring 25 is preloaded by means of two parts of the outer shell or housing of the clutch assembly 11 which can be adjusted axially relative to one another. As stated, the spring 25 can preferably be interchanged and/or adjusted, thus enabling the magnitude of the braking action between the brake disk and the braking element or braking elements to be changed.

The braking element or elements jointly form the main friction surface 22, which produces the main braking action by means of friction with a mating friction surface 22a, formed by the brake disk, of the main braking element 15 in the engaged state of the main braking element 15, and thus brakes the movement introduced on the output side.

According to a further teaching, which is of independent significance, a closure element assembly having a closure element 2, preferably a flap, and at least one drive assembly 1 in accordance with the proposal is claimed. Reference may be made to all the statements made in relation to the drive assembly 1 according to the proposal in accordance with the above teachings.

The drivetrain 4 extends between a body 7 of the motor vehicle 3 and the closure element 2, and the brake assembly 13 is designed in such a way that it holds the closure element 2 in an intermediate position, preferably in any intermediate position, for example against weight forces and against any spring forces that may be present.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS 1 drive assembly
2 closure element
3 motor vehicle
4 drivetrain
5 connections
6 connections
7 body
8 motor
9 drive axis
10 spindle/spindle nut mechanism
11 clutch assembly
13 brake assembly
14 control unit
15 main braking element
16 freewheel assembly
17 auxiliary braking element
18 spring
19 spring end
20 contact surface
21 contact surface
22 main friction surface
23 projections
24 permanent friction surface
25 spring
26 screw
27 upperpart
28 part
12a input connection
12b output connection
22a mating friction surface
24a permanent friction surfaces While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive assembly for adjustment of a motor vehicle closure element, the drive assembly comprising:
   a drivetrain; and a clutch assembly connected to the drivetrain and provided with,
an input connection and an output connection, wherein the clutch assembly is configured to transmit movement from the input connection to the output connection,
a brake assembly including a main braking element configured to produce a main braking action, by means of which the main braking element brakes a movement introduced on the output connection,
a freewheel assembly configured to engage the main braking element in response to the movement introduced on the output connection and to disengage the main braking element in response to a movement introduce on the input connection, and
an auxiliary braking element configured to produce a predetermined permanent braking action, by means of which the auxiliary braking element acts on the movement introduced on the output connection, and wherein the predetermined permanent braking action must be overcome so that the freewheel assembly disengages from the main braking element.

2. The drive assembly of claim 1, wherein the freewheel assembly includes a clutch element.

3. The drive assembly of claim 2, wherein the clutch element includes a first contact surface and the main braking element includes a second contact surface, wherein when the main braking element is in an engaged state, the first contact surface and the second contact surface conjointly rotate with one another, and wherein when the main braking element is in a disengaged state, the first contact surface is spaced apart from and rotates relative to the second contact surface.

4. The drive assembly of claim 1, wherein the auxiliary braking element includes a main friction surface configured to engage a mating friction surface disposed on the main braking element.

5. The drive assembly of claim 1, wherein the auxiliary braking element and/or the main braking element each include a permanent friction surface axially spaced apart from one another and each provided with a friction lining configured to produce the predetermined permanent braking action of the auxiliary braking element by generating friction between the friction lining of the auxiliary braking element and/or the main braking element and an associated mating friction surface of the input connection and/or output connection.

6. The drive assembly of claim 5, wherein the permanent friction surface of the auxiliary braking element and/or the main braking element has a first mean friction radius (RP) and the main friction surface has a second mean friction radius (RH), wherein the first and second mean friction radii are each arranged with respect to a drive axis of the drivetrain, and wherein the second mean friction radius (RH) is smaller than the first mean friction radius (RP).

7. The drive assembly of claim 1, wherein the predetermined permanent braking action is less than the main braking action so that the predetermined permanent braking action is overcome during each adjustment of the closure element.

8. The drive assembly of claim 1, wherein the auxiliary braking element includes a spring configured to be interchanged and/or adjusted to adjust a magnitude of the predetermined permanent braking action of the auxiliary braking element and/or the magnitude of the main braking action.

9. The drive assembly of claim 8, further comprising:
an adjusting element including an adjusting screw configured to axially adjust the spring along a drive axis of the drivetrain.

10. The drive assembly according to claim 1,
wherein the freewheel assembly includes a wrap spring configured to be radially or axially adjusted in response to movements introduced into the clutch assembly via the output connection and the input connection and thereby engage and disengage the main braking element, and
wherein a contact surface of the wrap spring is frictionally connected to a contact surface of the main braking element when the main braking element is engaged, and wherein the contact surface of the wrap spring and the contact surface of the main braking element are not in contact with one another when the main braking element is disengaged.

11. The drive assembly of claim 10, wherein when the input connection moves the freewheel assembly, no friction arises between the contact surface of the main braking element and the contact surface of the wrap spring.

12. The drive assembly of claim 1, wherein the drivetrain extends between a motor vehicle body and the closure element and the brake assembly is configured such that the drive assembly holds the closure element in an intermediate position against weight forces and spring forces applied to the drive assembly.

13. The drive assembly of claim 2, wherein the clutch element is a wrap spring configured to radially extend and retract to engage and disengage the main braking element.

14. The drive assembly of claim 8, wherein the spring is a wave spring.

15. The drive assembly of claim 14, further comprising:
a wrap spring disposed on the input connection and configured to extend radially to engage the main braking element and retract radially to disengage the main braking element.

16. The drive assembly of claim 15, wherein the main braking element is radially disposed between the wave spring and the wrap spring.

17. The drive assembly of claim 16, wherein the auxiliary braking element includes an upper part disposed between portions of the main braking element and the wave spring.

18. The drive assembly of claim 1, further comprising:
a compression spring; and
an adjusting element including an adjusting screw configured to axially adjust the compression spring along a drive axis of the drivetrain.

* * * * *